June 23, 1942.   J. F. DALE   2,287,728
SORTING MACHINE
Filed May 31, 1941   6 Sheets-Sheet 3
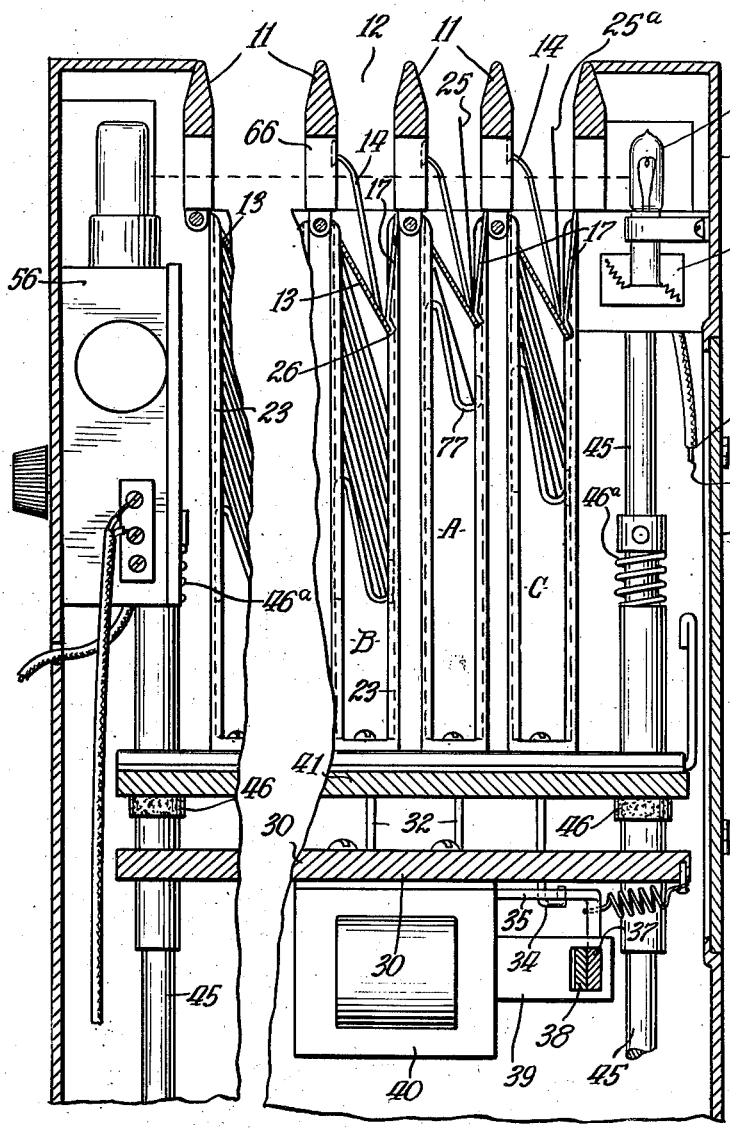
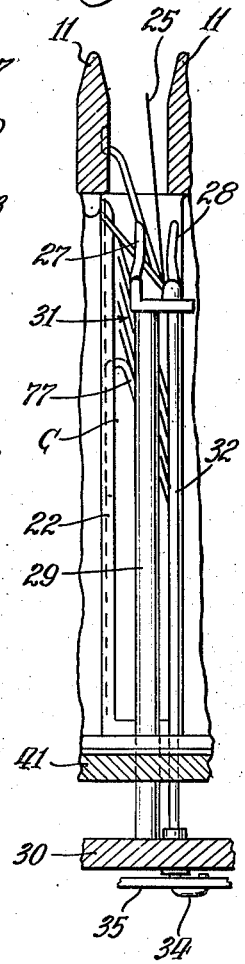
Inventor:
James F. Dale
By Barnett + Truman Attys.

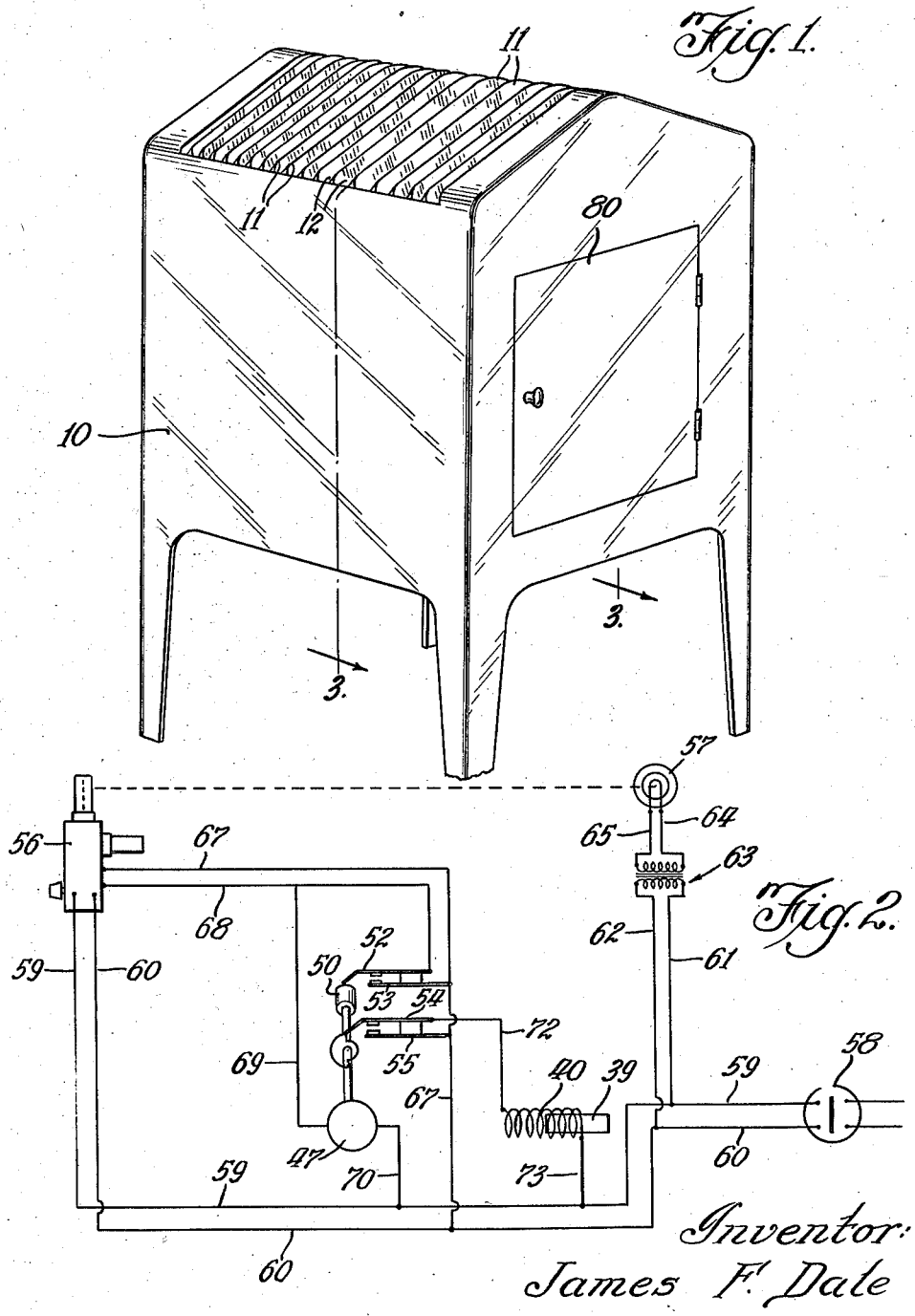

June 23, 1942.  J. F. DALE  2,287,728
SORTING MACHINE
Filed May 31, 1941  6 Sheets-Sheet 4
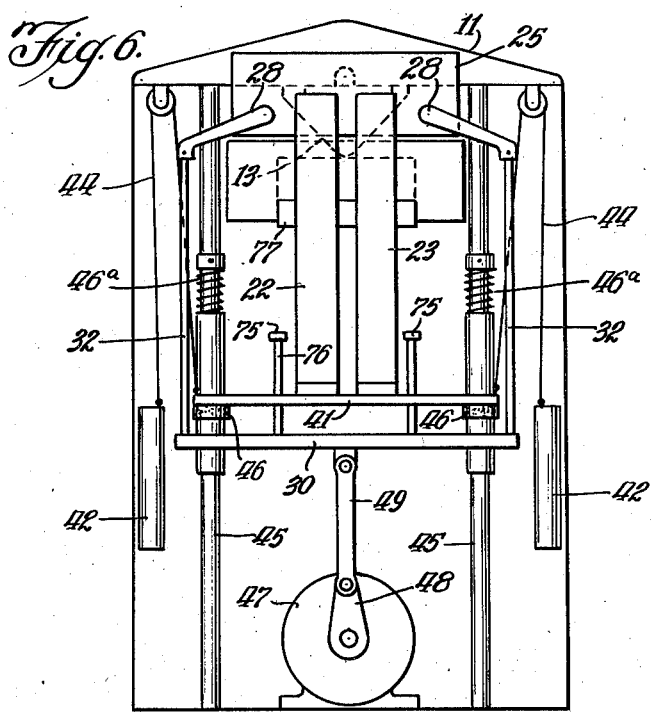
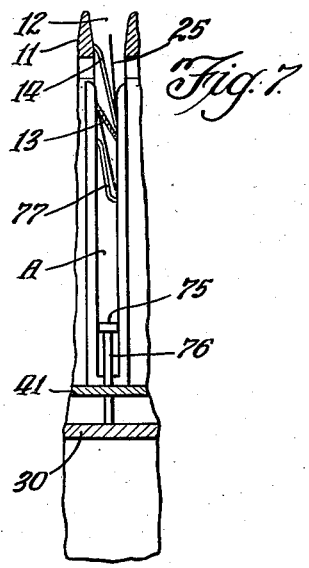
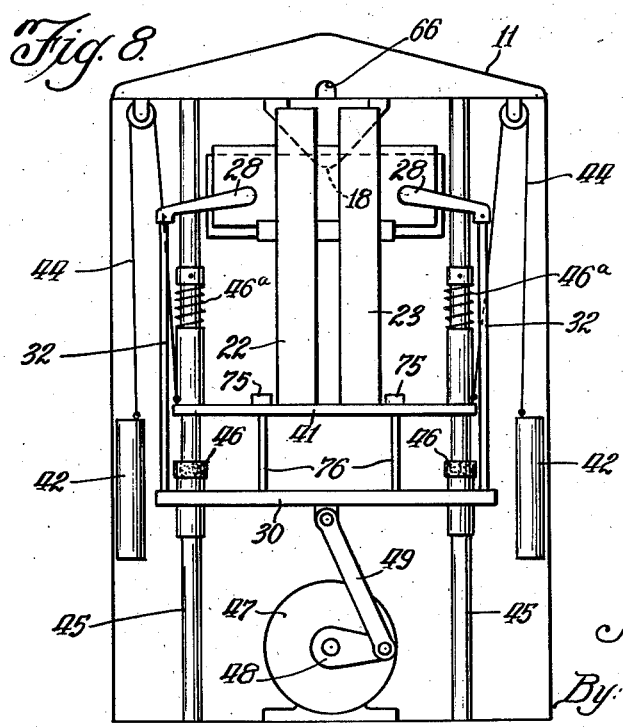
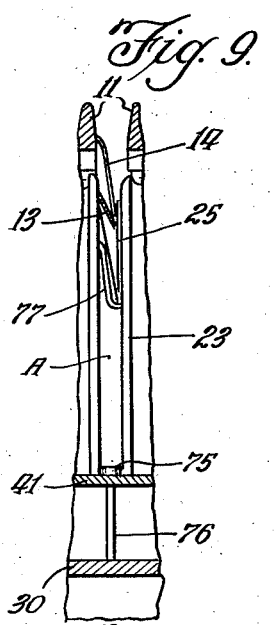
Inventor:
James F. Dale
By Barnett & Truman Attys.

June 23, 1942.  J. F. DALE  2,287,728
SORTING MACHINE
Filed May 31, 1941   6 Sheets-Sheet 5

Inventor
James F. Dale
By Barnett & Truman Attys.

June 23, 1942.  J. F. DALE  2,287,728
SORTING MACHINE
Filed May 31, 1941     6 Sheets-Sheet 6
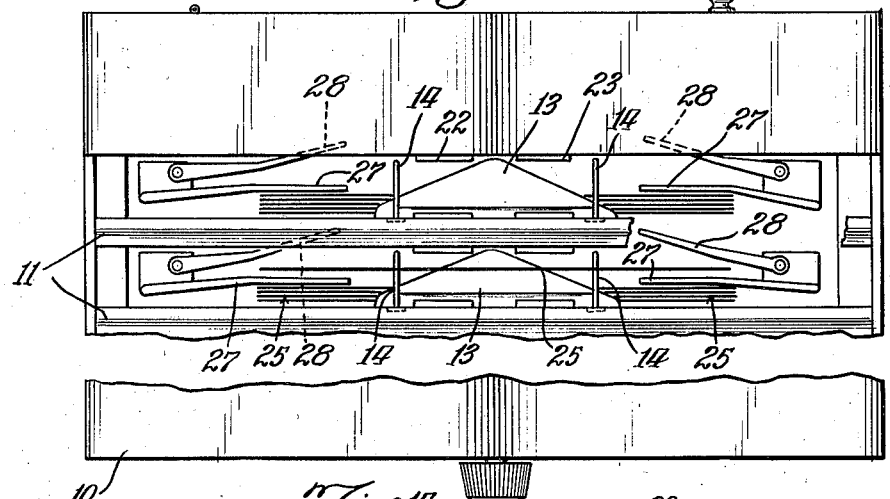
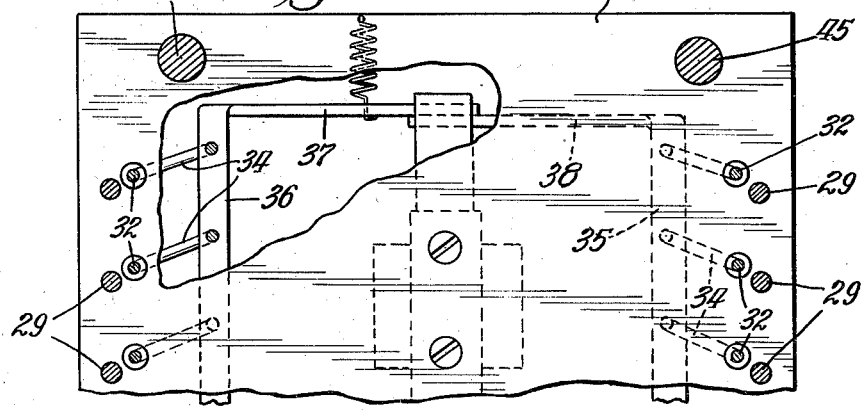
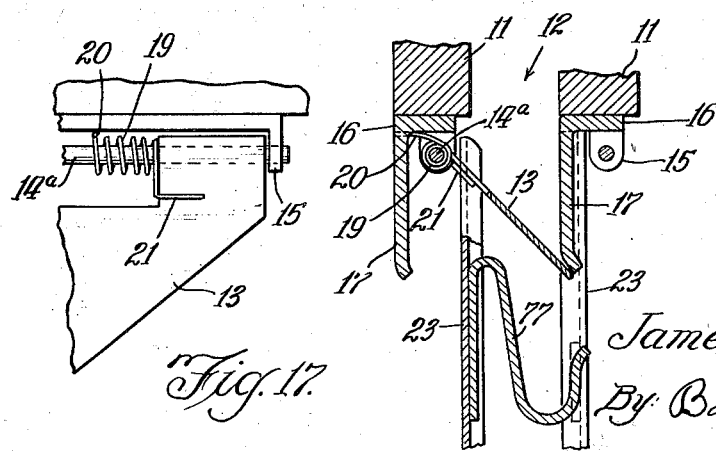
Inventor:
James F. Dale
By Barnett & Truman
Attys.

Patented June 23, 1942

2,287,728

UNITED STATES PATENT OFFICE 2,287,728

SORTING MACHINE

James F. Dale, Highland Park, Ill.

Application May 31, 1941, Serial No. 396,036

24 Claims. (Cl. 271—64)

This invention relates to an improved machine adapted to facilitate the manual sorting of business papers into predetermined classified groups.

A principal object of the invention is to provide a machine of the above general character which will, by reason of its mechanical aid to a sorting clerk, increase such clerk's efficiency both in work out-put and accuracy. In this connection the invention contemplates a machine having paper receiving compartments which are so formed as to provide a relatively large capacity for each compartment and at the same time permit a relatively large number of such compartments to be arranged in a small area so as to be within easy arm's reach of a sorting clerk and thereby remove certain of the major factors of fatigue and loss of time.

A more specific object is to provide a machine of the above character in which the paper receiving compartments are defined by narrow, vertically disposed members and each compartment is provided with a paper holder adapted to be adjusted vertically to vary the capacity of the compartment in accordance with the volume of papers received therein.

Another object is to provide simplified and efficient means for grasping papers, inserted into one or more of the receiving slots, and thereafter deliver them into predetermined compartments wherein they are compressed with others to form orderly arranged stacks.

Another object is to provide, in a sorting apparatus of the above character, operating mechanism adapted to be actuated by the movement of a paper into any one of the receiving slots, but which, after such mechanism is once set in motion, the operator may insert papers into any of the said receiving slots without affecting the operation of the moving parts of the apparatus. In this way the machine permits the operator, when the papers being sorted require tabulation of data thereon, to devote his full attention to such sorting and tabulation without regard to the continuous or repeated operations of the sorting machine.

Inasmuch as the machine herein shown has been devised on the basis of proportions regarded as suitable for handling bank checks, the invention will be described herein with relation to the problems solved by such use. However, it should be recognized that such description is merely by way of illustration and is not to be regarded as restricting the scope of the invention. Obviously, the machine herein shown might be used for sorting other business papers coming within the range of sizes contemplated by the proportions illustrated. It is also equally obvious that the proportions of the various parts might be suitably varied to accommodate business papers of other sizes.

Various other objects and advantages of the improvements herein disclosed will be apparent from the description of the specific embodiments shown in the drawings. It will be understood, therefore, that the present invention contemplates as a specific object the provision of the novel constructions, arrangements and combinations of parts and devices hereinafter shown and described, together with all variations and changes in structure coming within the scope of the appended claims.

In the drawings:

Fig. 1 is a view in perspective of a cabinet enclosing the operating parts of the invention and showing the provision of a plurality of slots in the upper portion of the cabinet.

Fig. 2 is a wiring diagram.

Fig. 4 is a fragmentary sectional view taken substantially on line 4—4 of Fig. 1 to illustrate the manner in which the sorted papers are arranged in the several paper receiving compartments of the apparatus.

Fig. 5 is a fragmentary view, partly in section, taken substantially on line 5—5 of Fig. 3 and looking in the direction of the arrows to illustrate certain constructions of the members adapted to grasp a paper when it is inserted in the machine.

Figs. 6 and 7 are diagrammatic views of the various parts shown in the position illustrated in Fig. 3.

Figs. 8 and 9 are similar diagrammatic views illustrating the movement of the parts during the first portion of the operation.

Fig. 14 is a fragmentary plan view, with parts broken away, to illustrate the construction of the paper gripping members.

Fig. 15 is a fragmentary plan view of a vertically movable carriage on which the paper grasping members are supported and illustrating also the arrangement of electromagnetically operated means for operating the various paper gripping members.

Fig. 16 is a fragmentary sectional view on a somewhat larger scale of the upper portion of one of the paper receiving compartments of the apparatus together with associated mechanisms, and Fig. 17 is a fragmentary view in elevation, on an enlarged scale, of a resiliently hinged member which extends into the entrance end of the paper-receiving compartment.

Figure 3:
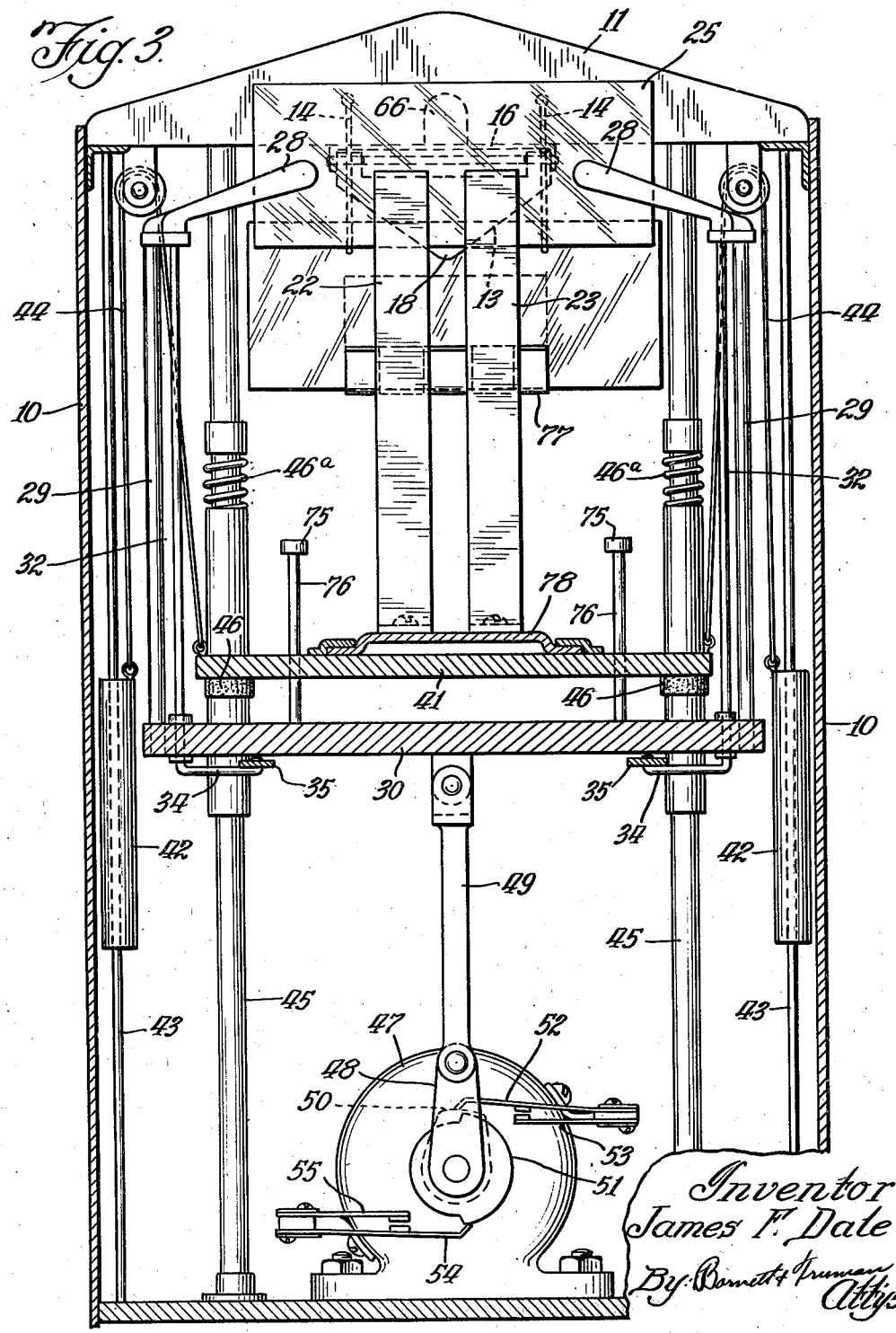
Fig. 3 is a vertical section taken substantially on line 3—3 of Fig. 1.

The operating mechanism of the apparatus is enclosed in a cabinet 10. The top portion of the cabinet preferably slopes downwardly in opposite direction from the longitudinal central portion. It is provided with a series of transversely extending vanes or partitions 11 which define narrow slots 12 through which the sorted checks are fed into the apparatus. In the construction illustrated, the spacing of the slots 12 is exaggerated for the purpose of clearness. Normally the width of a slot should be such that a check, when inserted therein, will maintain an upright position. The narrow width of the slot also makes it practicable to arrange a large number of them within convenient reach of an operator.

Located beneath each of said slots 12 are yieldable means comprising a hinge member 13 and a pair of wires 14—14 for temporarily supporting a check until it is carried, by means hereinafter described, into a compartment or magazine associated with said slot. The said hinge member 13 is of general V-shape and is pivotally suspended from a shaft 14ª fitted in openings of depending ears 15 of an inverted U-shaped bracket 16. The bracket, in each case, is suitably fixed to the lower edge portion of a partition vane 11 and is provided at its middle with a downwardly extending arm 17 as shown best in Figs. 3 and 16. The arm 17 serves as an abutment adapted to engage the rounded central point 18 of the hinge and thereby limit the forward swinging movement of the hinge member. The hinge member is normally held in resilient engagement with the arm 16 by means of springs 19—19, the ends 20—21 of which bear respectively against the bottom of a vane 11 and the under-surface of the hinge 13. The springs 19—19 are illustrated herein merely as a matter of convenience in illustrating one suitable means for biasing the hinge member in a direction to press resiliently against the abutment arm 17.

The hinge member 13 slopes downwardly into the space between the upper ends of a pair of U-shaped stanchions 22—23. The said stanchions are arranged vertically so that the space defined by the leg portions of each pair of stanchions constitute a check receiving compartment. A pointed central portion 18 of the hinge preferably extends into the space 24 between the stanchions. A similar arrangement is provided for the spring wires 14—14 whereby their lower ends overlap the outer vertical edges of the stanchions. These arrangements of the supporting members 13—14 support the lower edge of a check, for example, check 25 in the bite between the resilient yieldable supports and the forward inner face 26 of the check compartment. It will be observed, as the description of the apparatus progresses, that the overlapping arrangement of the members 13—14 relative to the vertical edge of the stanchions makes it practicable to utilize these supporting members as guides for directing the upper edge of the check toward the opposite wall of the compartments during the upward movement of the stanchions, as hereinafter mentioned.

The checks, when delivered into a compartment 26, must be forced or pulled downwardly past the temporary supports 13—14. This operation is accomplished by means of clamp arms 27—28 which clampingly grip the opposite end portions of the check, and then pull the check downwardly into said compartment 26 beneath the hinge member 13. There are two pairs of clamp arms 27—28 for each slot 12 of the apparatus. Both of the arms of each pair may be formed to move into and out of clamping engagement with a check. However, for the purpose of simplifying the illustration, the arms 27 of each pair (see Figs. 5 and 14) are supported in fixed position on a vertical post 29. The lower end of each supporting post 29 is suitably fixed to the marginal portion of a vertically movable table 30. The check engaging end of said arm 27 is preferably positioned in advance of the stack 31 of checks (see Fig. 5) and slightly to the rear of the forward surface of supporting wires 14—14. This arrangement insures that each check inserted in a slot 12 will always assume a position between the clamping arms 27—28. The arm 28 of each pair of clamping devices is movable into and out of clamping engagement with the check. It is mounted on a vertical shaft 32, the upper end of which is journaled in a flange portion 33 at the upper end of the vertical post 29. The lower end of the shaft 32 is turned at an angle to provide inwardly extending lever arms 34. The ends of the lever arms 34 for all movable clamp arms are operatively connected to bars 35—36 which extend lengthwise of table 30. The forward ends of the said bars 35—36 are bent inwardly to provide angularly disposed arms 37—38 which are slidably connected with the reciprocating core 39 of a solenoid 40, secured to the bottom surface of the reciprocating table 30.

It will be observed, by inspection of Figs. 4, 14 and 15 of the drawings, that energization of the solenoid 40 will move the bars 35—36 in the direction of their length and thereby swing the lever arms 34 in a direction to close all of the movable clamp arms 28. Consequently, a check positioned in any one of the slots 12 will be firmly grasped by the clamp arms associated with that slot. Ordinarily there will be only one check inserted into the machine for each full cycle of operation. This will be particularly true when the machine is used in combination with other apparatus for automatically listing and/or totalizing the amounts of the items delivered to each of the several compartments. However, in some situations it may be desirable to so operate the present machine as to permit a plurality of checks or other papers to be inserted therein for each operating cycle.

The downward movement of a check into any one of the stacking compartments 26 is accomplished by moving the lower table downwardly relative to the upper table 41 on which the said stanchions 22—23 are supported. The upper table 41 is supported and operated so that it will maintain its uppermost position during the initial downward movement of the lower table 30. This result is obtained in the present embodiment by means of counter-weights 42—42 guided on the vertically extending rods 43 and connected by means of a flexible connector 44 to the said table 41. If desired, any equivalent means, such for example as a frictional engagement of the table 41 with a fixed member or cam operation thereof, may be used instead of the counterweights 42—42.

Both tables 30 and 41 are guided in their vertical movements on the vertical guides 45. When the said tables are in their normal or up position, buffer members 46 carried by the table 30 bear against the bottom surface of the upper table 41. The upward movement of the upper table 41 is limited by coiled springs 46ª. A motor 47 provided with a crank arm 48 is connected by means of a connecting rod 49 to the lower table 30. The said motor mechanism includes a central shaft 49 on which are mounted cams 50 and 51. The cam 50 operates to open and close electric contact arms 52—53 and thereby control one of the motor energizing circuits. The cam 51 opens and closes the switch contact arms 54—55 for making and breaking an electric circuit through the solenoid 40.

Referring now to the wiring diagram of Fig. 2 and the diagrams of Figs. 6 to 13 inclusive showing the cycle of operation of the machine: When the operating mechanism is in its normal "at rest" position, the switch arms 52—53 and 54—55 are open, as indicated in Figs. 2 and 3. The first operating circuit through the motor 47 is, therefore, established by an electric eye means 56 located at one end of the apparatus. When the apparatus is in its normal rest position the electric eye means is under the control of a beam of light emitted from a low voltage electric light 57 located at the opposite end of the apparatus. The said light 57 operates continuously when the snap switch 58 is turned to the "on" position. The lighting circuit includes the main wires 59—60, leads 61—62 to a transformer 63, thence through leads 64—65 from the step down coil of the transformer to the light bulb. The said beam of light is projected the full length of the apparatus through aligned openings 66 in the several partition vanes 11 so that the beam can be blocked by the insertion of a check into any of the slots 12. However, when the light beam is operative and the operating mechanism is in the normal "up" position, a circuit is closed through electrically energized devices (not shown) which are enclosed in the casing and form a part of the said electric eye means. This circuit is as follows: Main line 59 to certain electrically energized devices (not shown) of the electric eye means 56, thence through wire 67 to the other side 60 of the main line.

The above "at rest" circuit is broken when the light beam is blocked in the manner previously mentioned. Immediately thereafter a temporary operating circuit is closed through the electric eye means 56 as follows: main line wire 60 to certain of the electrically energized devices (not shown) of electric eye means, thence through wires 68 and 69 to the motor 47 and lead 70 to the other side 59 of the main line. This motor-operating circuit will continue in control until the check, for example check 25, is pulled downwardly a distance sufficient to permit the beam of light to again pass to the electric eye means 56. However, before the said light beam is made effective to control the electric eye means, the cam 50 will have been rotated in a counter-clockwise direction to close a circuit through spring contact arms 52—53 as follows: wires 60 and 67 to contact 53, thence through contact arm 52 and wires 68, 69 to the motor 47 and wire 70 to the other side 59 of the main line. By means of this circuit the motor gear shaft 49 and the crank arm 48 will be caused to make one complete revolution. At this time the cam 50 again opens the switch arms 52—53 to stop the motor. However, if in the meantime other checks have been inserted in the said slot 12, the motor will continue to operate until the crank arm completes another complete revolution and returns control of the electric eye means 56 to the beam of light.

Substantially instantaneously with the closing of the temporary operating circuit through the motor 47, the motor cam 51 is turned sufficiently to close the spring contact arms 54—55. This establishes an energizing circuit through the solenoid 40 as follows: wires 60, 67 and 71 to contact arm 55, thence through contact 54, wire 72, solenoid 40, wire 73 to the other side 59 of the main line.

The above energization of solenoid 40 operates the movable clamping arms 28 to firmly grasp the opposite ends of a check positioned in a slot 12, for example, the said check 25, whereby the check is drawn downwardly into the underlying stacking compartment A (Fig. 4). During the first portion of the downward movement of said check (see Figs. 8 and 9) the lower table 30 and the check gripping arms 27—28 move downwardly relatively to the upper table 41 while the latter remains in its extreme "up" position. During the second portion of the operating cycle, the heads 75 of lag motion connectors 76 engage the upper table 41 and pull it downwardly to the position indicated in Figs. 10 and 11. In this position of the operating parts, it will be observed, the check 25 has been drawn a substantial distance below the pivoted gate or hinge 13, the clamping arms 27—28 are opened and the check is supported on an adjustable holder 77.

Figure 10:
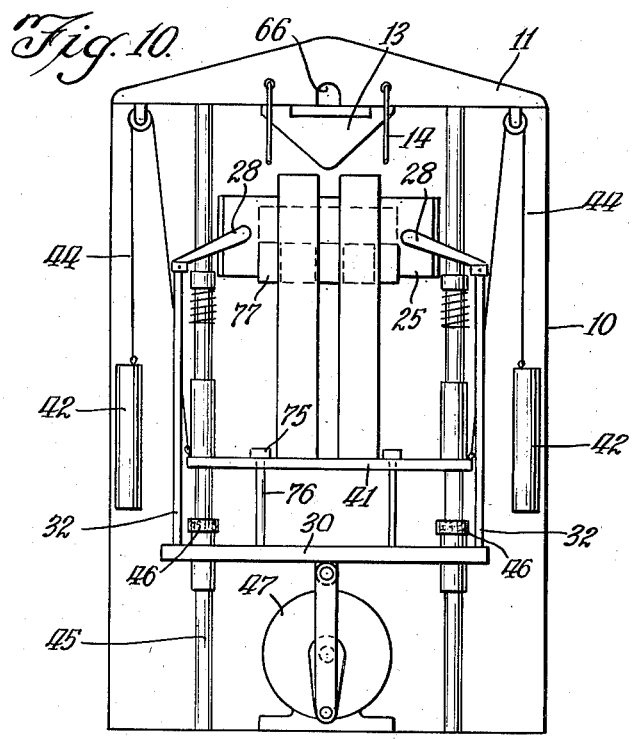
Figs. 10 and 11 illustrate the position of the parts when the apparatus has completed one-half of its full cycle of operations.
Figure 11:
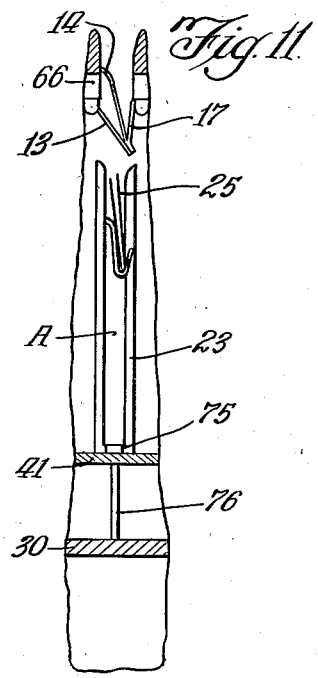
Figure 12:
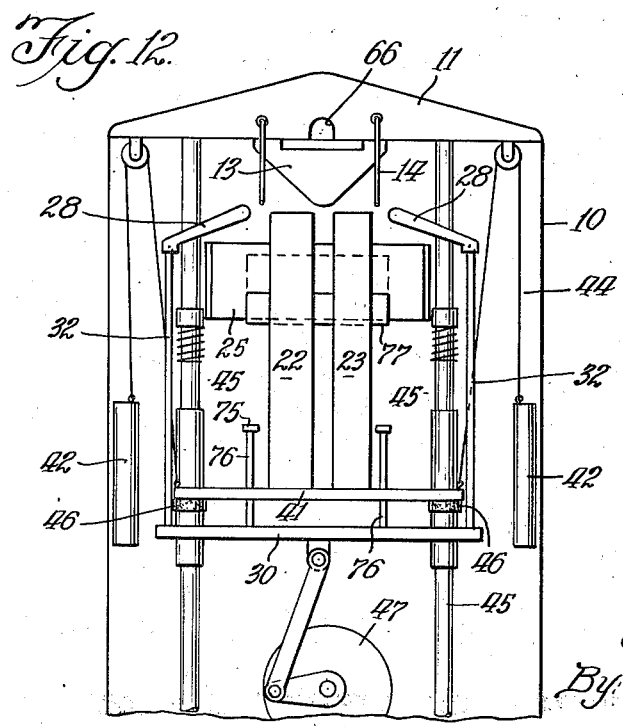
Figs. 12 and 13 are similar diagrammatic views illustrating the parts in their respective positions when the apparatus has completed approximately three-fourths of its operating cycle.
Figure 13:
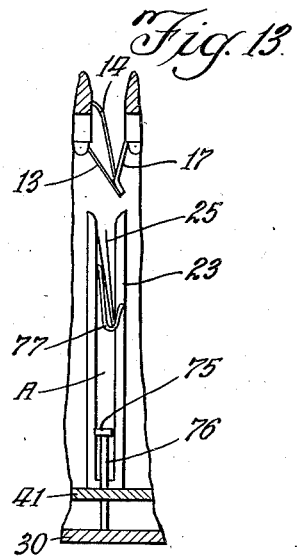

During the third quarter of the operating cycle, for example, the movement of the mechanism from the positions indicated in Figs. 10 and 11 to the positions indicated in Figs. 12 and 13, the lower table 30 and the opened clamp arms 27—28 move upwardly, but the upper table 41 and the several check compartments supported thereon remain in the lowermost position. The said relative upward movement carries the clamp arms upwardly above the upper edge of the check 25, whereby it is free to move toward the rear wall of the stacking compartment.

During the last quarter of the operating cycle, the buffers 46, carried on the lower table 30, engage the bottom face of the upper table 41 and thereby carry it upwardly to the starting position. During this movement, the upper edge of the check, or stack of checks, contained in the stacking chamber is pressed against the inclined lower face of the hinge member 13 so as to press the checks toward the rear wall of the stacking chamber.

When a sufficient number of checks has been drawn into the stacking compartment A to fill the curved bottom portion of the holder 77, the checks subsequently drawn into said compartment are caused to wedge between the stack and the forward face of the compartment. When the upper edge of the stack is pressed against the under face of the hinge 13 by the upward movement of the operating parts to their normal "up" position, the said pressure will automatically impart a downward step by step adjustment to the check holder 77 and thereby increase the capacity of the stacking compartment in relation to the number of checks introduced. The effects of this adjustment will be readily seen by comparing the position of the check holder 77 in compartment B (Fig. 4) relative to the position of the like holder in compartment C. If desired, a similar adjustment of the check holder may be effected by the wedging pressure of the checks between the stack and the forward face of the stacking compartment when the checks are drawn downwardly by the downward movement of the clamping arm.

After the check sorting operations have been completed, the sorted checks may be readily removed from the stacking compartments. In this connections all of the said stanchions 22—23 are supported on a base 78 which is slidably supported on the upper table 41 between guides 79—79. The base 78 and the means thereon providing the check stacking compartments may be wholly or partially withdrawn from the cabinet through the door 80. In order to accomplish this result, however, it is necessary to move the operating mechanism downwardly until the upper ends of the stanchions 22—23 can clear the lower ends of the temporary supports 13 and 14—14. When the operating mechanism has been moved to a suitable "down" position, it can be stopped in such position by opening the circuit through the snap switch 58.

I claim:

1. A machine for sorting business papers comprising means defining a plurality of sorting compartments, means defining separate feed passage-ways leading to the entrance ends of the said compartments, and means for delivering said papers into the said compartments to form edgewise stacks of increasing height.

2. A machine for sorting business papers comprising means defining a plurality of sorting compartments, means defining thin passage-ways leading to the entrance ends of the said compartments, whereby a relatively large number of such passage-ways may be arranged in an area within easy arm's reach of an operator, and means for delivering said papers edgewise into said compartments to form stacks therein in which the papers are overlapped in offset relation lengthwise of the compartments.

3. A machine for sorting business papers comprising means defining a plurality of sorting compartments, means defining separate feed passage-ways leading to the entrance ends of the compartments, yieldable means interposed in the paths of movement of the sorted papers for supporting them temporarily, and means for forcing said papers past the temporary support and into the sorting compartments associated with the passage-ways in which the papers were inserted.

4. A machine for sorting business papers comprising means defining a plurality of sorting compartments, means defining separate feed passage-ways leading to the entrance ends of the said compartments, means movable into and out of the paths of travel of the sorted papers to provide releasable supports therefor and means for forcing said papers past the said supports and into sorting compartments associated therewith.

5. A machine for sorting business papers comprising means defining a plurality of sorting compartments, means defining thin passage-ways leading to said compartments, yieldable means positioned adjacent the entrance ends of said compartments and extending, in each case, beyond the forward inner face thereof for temporarily supporting the sorted papers, and means for forcing the papers past said temporary supports and into the said compartments associated therewith.

6. A machine for sorting business papers comprising means defining a plurality of thin feed passage-ways, separate compartments positioned beneath the respective passage-ways, means for temporarily interrupting the movement of the papers through said passage-ways, and paper grasping devices movable relative to said compartments for delivering the papers from said movement interrupters into associated compartments.

7. A machine for sorting business papers comprising means defining a plurality of vertically extending feed passage-ways, separate compartments positioned beneath respective passage-ways, means positioned above the compartments for temporarily interrupting the movement of the papers, and paper grasping devices movable relative to said compartments for delivering the papers from said movement interrupters into underlying compartments.

8. A machine for sorting business papers comprising, in combination, means defining a plurality of narrow passage-ways, separate compartments, one for each passage-way, formed relatively high and narrow and disposed beneath the respective passage-ways, means comprising separate yieldable members overlying each of said compartments for interrupting the movement of the sorted papers, and vertically movable paper grasping means for each compartment adapted to grasp a paper and move it downwardly into compressing engagement between a vertical wall of said compartment and the papers previously introduced therein.

9. A machine for sorting business papers comprising, in combination, means defining a plurality of narrow passage-ways, separate compartments, one for each passage-way, formed relatively high and narrow and disposed beneath the respective passage-ways, means comprising separate yieldable members overlying each of said compartments for interrupting the movement of said sorted papers, vertically movable members for clasping the papers contained in said passage-ways and adapted to move them downwardly into compressing engagement between the vertical wall of said compartments and the papers previously introduced therein, and paper holders adjustably supported in said compartments for varying the capacity thereof in accordance with varying requirements.

10. A machine for sorting business papers comprising, in combination, means defining a plurality of narrow passage-ways, separate compartments, one for each passage-way, formed relatively high and narrow and disposed beneath the respective passage-ways, means comprising separate yieldable members overlying each of said compartments for interrupting the movement of the sorted papers, vertically movable paper clasping means for each compartment adapted to grasp a paper and move it downwardly into compressing engagement between a vertical wall of said compartment and the papers previously introduced therein, and a frictionally supported paper holder in each compartment adapted to be pressed downwardly for engagement of the papers therein against an undersurface of said movement interrupting means; the said papers being arranged in upright position in stacks of increasing height.

11. A machine for sorting business papers comprising, in combination, an upper table and a lower table supported for vertical movement, means carried on the upper table and defining a relatively high but narrow compartment for receiving sorted papers, paper clasping members carried on the lower table and movable into and out of paper clasping engagement, and means for moving the lower table downwardly relative to the upper table during said paper clasping engagement to deliver the paper into said compartment.

12. A machine for sorting business papers comprising, in combination, an upper table and a lower table supported for vertical movement, means carried on the upper table and defining a relatively high but narrow compartment for receiving sorted papers, paper clasping means carried on the lower table and movable into and out of paper clamping engagement, means for moving the lower table downwardly relative to the upper table during said paper clasping engagement to force the paper edgewise into compressing engagement between a vertical wall of the compartment and the papers previously introduced therein, a paper holder frictionally supported in said compartment and means overlying the said stack of papers and adapted to be engaged by said stack during a predetermined portion of the operating cycle of the machine whereby the frictional holder is pressed downwardly and the paper is introduced into the compartments from an edgewise stack of increasing height.

13. A machine for sorting business papers comprising, in combination, means defining a feed slot, a sorting compartment for receiving papers from said slot, yieldable supporting means for the sorted paper overlying said compartment and inclining downwardly toward one wall thereof so that the papers will enter the said compartment in an upright position adjacent said wall, vertically movable paper clasping devices for drawing the paper past the said overlying support and into said compartment and means thereafter operable to move the said paper upwardly relative to said overlying support, whereby the upper edge portion of the paper is pressed against the under surface of said support and thereby deflected toward the opposite side of the compartment so that the next paper delivered into the compartment will assume a position between the first mentioned wall and the papers previously introduced.

14. A machine for sorting business papers comprising, in combination, means defining a feed slot, a sorting compartment for receiving papers from said slot, yieldable supporting means for the sorted paper overlying said compartment and inclining downwardly toward one wall thereof so that the papers will enter the said compartment in an upright position adjacent said wall, vertically movable paper clasping devices for drawing the paper past the temporary support and into said compartment, and means for moving the said compartment upwardly relative to said overlying support, whereby the upper edge portion of the last paper introduced therein is pressed against the under surface of said overlying support and thereby deflected toward the opposite side of the compartment so that the next paper delivered into the compartment will assume a position between the first mentioned wall and the papers previously introduced.

15. A machine for sorting business papers comprising, in combination, an upper table and a lower table supported for vertical movement, a sorting compartment carried on the upper table, means defining a passage-way for directing sorted papers into said compartment, downwardly inclined yieldable means overlying said compartment for temporarily supporting the sorted papers as they are introduced into the apparatus, means carried on the second table for clasping the temporarily supported papers, operating means for moving said lower table downwardly relative to the first table, whereby the paper clasped by said clasping means is drawn downwardly into said compartment, and means for moving said upper table downwardly during a portion of the downward movement of the paper and then upwardly relative to said yieldable means, whereby the upper edge of the paper is deflected toward one side of the compartment by engagement with the under surface of said temporary supporting means.

16. A machine for sorting business papers comprising, in combination, an upper table and a lower table supported for vertical movement, a sorting compartment supported on the upper table, means defining a passage-way for directing sorted papers into said compartment, yieldable means overlying said compartment for supporting the sorted papers, preliminarily to their delivery into the compartment, electro-magnetically operated means for clasping the temporarily supported paper, an electric motor means for moving the said tables downwardly and then upwardly whereby the paper is drawn downwardly past said temporary supporting means and delivered into said compartment, and means actuated by the insertion of the paper into said passage-way to close energizing circuits through said motor means and said electro-magnetic means.

17. In a machine for use in sorting business papers, the combination of means defining a compartment for receiving the sorted papers, a passage-way for directing papers into said compartment, electro-magnetically operated means for clasping a paper introduced into said passage-way, electric motor operated mechanism for imparting downward movement to said paper clasping means so as to deliver a sorted paper into said compartment, means directing a beam of light transversely of said passage-way, and means including a photo-electric cell for closing an energizing circuit through said motor when the said beam of light is obstructed by the insertion of a sorted paper into said passage-way.

18. In a machine for use in sorting business papers, the combination of means defining a compartment for receiving the sorted papers, a passage-way for directing papers into said compartment, electro-magnetically operated means for clasping a paper introduced into said passage-way, electric motor operated means for imparting downward movement to said paper clasping means so as to deliver the sorted paper into said compartment, means directing a beam of light transversely of said passage-way, a photo-electric cell controlled by said light beam and adapted when said beam is obstructed by the insertion of a paper in said passage-way to close a temporary energizing circuit through said motor, and a cam operated switch closed, while said photo-electric cell is in control, to establish a motor energizing circuit which will become effective to energize the motor when the said light beam is re-established.

19. In a machine for use in sorting business papers, the combination of means defining a compartment for receiving the sorted papers, a passage-way for directing papers into said compartment, electro-magnetically operated means for clasping a paper introduced into said passageway, electric motor operated means for imparting downward movement to said paper clasping means so as to deliver the sorted paper into said compartment, means directing a beam of light transversely of said passage-way, a photo-electric cell controlled by said light beam and adapted when said beam is obstructed by the insertion of a paper in said passage-way to close a temporary energizing circuit through said motor, a cam operated switch closed, while said photo-electric cell is in control, to establish a motor energizing circuit which will become effective to energize the motor when the said light beam is re-established, and a cam operated switch closed by the movement of the motor when making and breaking electric circuits through said electro-magnetic means at predetermined periods in the operating cycle of the machine.

20. A machine for sorting business papers comprising means defining a sorting compartment for receiving certain of said papers, a relatively thin passageway leading to said compartment, and paper clasping means movable relative to said compartment for grasping papers inserted in said passageway and delivering the said papers edgewise into said compartment.

21. A machine for sorting business papers comprising means defining a relatively long but thin compartment for receiving certain of said papers, a paper clasping means movable lengthwise of said compartment adapted to grasp a paper and move it edgewise into compressed engagement between a wall of said compartment and the paper previously introduced therein, and a paper holder adjustable lengthwise of the compartment to vary the capacity of the compartment in accordance with varying requirements and whereby the papers are overlapped in offset relation lengthwise of the compartment.

22. A machine for sorting business papers comprising means defining a sorting compartment for receiving certain of said papers, means defining a feed passageway leading to the entrance in said compartment, means for delivering said papers edgewise into said compartment to form edgewise stacks of increasing height, and a paper holder adjustably supported in said compartment for varying the capacity thereof in accordance with varying requirements.

23. A machine for sorting business papers comprising means defining a sorting compartment for receiving certain of said papers, means defining a passageway leading to the entrance end of said compartment, electrically energized means for delivering a paper into said compartment, and means actuated by the insertion of a paper into said passageway for closing and energizing electric circuit for said paper delivering means.

24. A machine for sorting business papers comprising means defining a sorting compartment for receiving certain of said papers, means defining a passageway leading to the entrance end of said compartment, electrically energized means for clasping and delivering a paper into said compartment, and means actuated by the insertion of a paper into said passageway for closing electric circuits for energizing said paper clasping and delivering means.

JAMES F. DALE.